United States Patent Office 3,312,729
Patented Apr. 4, 1967

3,312,729
PROCESS FOR PRODUCING 2-CHLORO-ACRYLONITRILE
Leonard O. Moore and Jared W. Clark, Charleston, W. Va., assignors to Union Carbide Corporation, a corporation of New York
No Drawing. Filed Dec. 30, 1963, Ser. No. 334,614
2 Claims. (Cl. 260—465.7)

This invention relates to a process for producing 2-chloroacrylonitrile. More particularly, this invention relates to a process for producing 2-chloroacrylonitrile by the dehydrochlorination of 2,2-dichloropropionitrile.

The process of the instant invention provides a very convenient and economical method of preparing 2-chloroacrylonitrile as the 2,2-dichloropropionitrile from which it is prepared is a low cost, commercially available material, and the product is obtained in excellent yields and at very high efficiencies.

The pyrolysis of 2,2-dichloropropionitrile to 2-chloroacrylonitrile and hydrogen chloride according to the process of the instant invention can be achieved by heating vapors of 2,2-dichloropropionitrile at a temperature of from about 400° C. to about 700° C., preferably from about 500° C. to about 625° C. The contact time necessary, i.e. the period of time that a unit volume of the reacting vapor is heated in the reaction zone, will, of course, vary with the temperature, with shorter contact times required at the more elevated temperatures. Generally contact times of from 0.1 second to 60 seconds, preferably from 0.5 second to 12 seconds, are suitable.

If desired, an inert gas, such as nitrogen, can be employed as a diluent in the reactor. While atmospheric pressure is employed, subatmospheric or superatmospheric pressure can also be employed if desired. The effluent vapors of the pyrolysis, with the exception of the hydrogen chloride formed and any inert gas employed, may be condensed and treated to separate the 2-chloroacrylonitrile by any suitable means, such as by fractional distillation.

The 2-chloroacrylonitrile produced in accordance with the instant invention can be employed as an insecticide, nematocide, or bactericide. In addition, because of the unsaturated group present, this product can be readily homopolymerized, or copolymerized with one or more unsaturated copolymerizable organic compounds to produce various polymeric materials having functional nitrile groups. Illustrative of the unsaturated organic compounds which can be copolymerized with 2-chloroacrylonitrile are such compounds as styrene, butadiene, methyl acrylate, methyl methacrylate, vinyl acetate, vinyl chloride, vinylidene chloride, acrylonitrile, methacrylonitrile, vinylidene cyanide, acrylamide, methacrylamide, vinyl methyl ether and the like. The polymeric materials produced by polymerizing 2-chloroacrylonitrile are useful elastomers.

Polymerization of 2-chloroacrylonitrile by the process of the instant invention can be effected by means of heat, light, or a suitable vinyl polymerization catalyst, such as a peroxide or azo compound. Preferably polymerization is effected by heating in the presence of a polymerization catalyst to shorten the reaction time. Temperatures ranging from as low as 50° C. to as high as 150° C. are generally effective for this purpose. Among the peroxides which can be employed as catalysts may be mentioned hydrogen peroxide, barium peroxide, magnesium peroxide, diethyl peroxide, di-tertiary-butyl peroxide, distearyl peroxide, diacetyl peroxide, distearoyl peroxide and acetyl benzoyl peroxide. Specific examples of the azo compounds which can be employed include α,α'-azo-bis-isobutyronitrile and 2,2'-dicyanoazobenzene.

The polymerization of 2-chloroacrylonitrile can also be effected in an emulsion or in a solution of the starting monomers. Good results are obtained by effecting polymerization in an inert liquid diluent such as acetonitrile, benzene, toluene, xylene and the like.

The following examples are set forth for purposes of illustration so that those skilled in the art may better understand this invention, and it should be understood that they are not to be construed as limiting this invention in any manner.

Example 1

2,2-dichloropropionitrile vapor was passed at a rate of 191 grams per hour through a tubular reactor 3 feet long and 1 inch in diameter, while the reactor was heated in a salt bath at a temperature of 524–529° C. The effluent vapors which emerged from the tube were passed through a brine-cooled condenser, and the condensed effluent was collected while hydrogen chloride vapor was removed in a water scrubber. The reaction was allowed to proceed for 30 minutes, during which time a total of 76.5 grams of condensed effluent were collected. Gas chromatography showed the condensed effluent to contain 44 percent by weight of 2-chloroacrylonitrile and 55.6 percent by weight of 2,2-dichloropropionitrile. This represented a yield of 2-chloroacrylonitrile of 52.7 percent and an efficiency of 95.8 percent.

Example 2

Four (4) parts by volume of 2,2-dichloropropionitrile vapor was pyrolyzed in a manner similar to the procedure of Example 1 with 1 part by volume of nitrogen for 10 minutes. A total of 156 grams of 2,2-dichloroacrylonitrile was passed through the reactor which was heated in a salt bath maintained at a temperature of 520–526° C. The contact time was 1.5 seconds. The yield of 2-chloroacrylonitrile was 21 percent and the efficiency was 91 percent.

The procedure was repeated at various temperatures and contact times, and with various amounts of nitrogen. The conditions and results of each pyrolysis are summarized in Table A below:

TABLE A

| Temperature, °C. | Contact Time, Seconds | Volume ratio of 2,2-dichloro-acrylonitrile/N$_2$ | Yield, percent | Efficiency, percent |
|---|---|---|---|---|
| 460–70 | 2.4 | 0.42 | 5.0 | >90.0 |
| 501–8 | 1.6 | 2.74 | 6.7 | 41.4 |
| 495–505 | 1.6 | (¹) | 9.9 | 26.6 |
| 505 | 3.4 | 0.83 | 19.3 | >90.0 |
| 508–10 | 1.9 | 1.0 | 7.5 | 26.0 |
| 501–12 | 2.8 | 1.2 | 16.4 | 75.0 |
| 509–27 | 2.9 | 1.1 | 22.4 | 59.7 |
| 520–6 | 1.5 | 3.9 | 21.0 | 91.0 |
| 520–2 | 2.7 | 4.5 | 34.4 | 90.0 |
| 524–9 | 2.9 | 4.1 | 39.7 | 77.0 |
| 523–5 | 3.0 | 3.9 | 36.3 | 94.6 |
| 525–9 | 2.9 | 1.1 | 32.8 | 70.4 |
| 524–30 | 3.1 | 1.0 | 41.1 | 70.7 |
| 524–7 | 2.8 | (¹) | 38.4 | 87.0 |
| 527–9 | 5.2 | (¹) | 50.1 | 97.2 |
| 532–8 | 3.2 | 0.89 | 35.7 | 83.6 |

¹ No N$_2$.

What is claimed is:
1. A process for producing 2-chloroacrylonitrile which comprises heating 2,2-dichloropropionitrile vapor at a temperature of from about 400° C. to about 700° C.
2. A process for producing 2-chloroacrylonitrile which comprises heating 2,2-dichloropropionitrile vapor at a temperature of from about 500° C. to about 625° C.

References Cited by the Examiner
UNITED STATES PATENTS 3,114,765   12/1963   Taylor _____ 260—465

CHARLES B. PARKER, *Primary Examiner.*
JOSEPH P. BRUST, *Examiner.*